June 20, 1939.  W. A. SEMION  2,163,134
FASTENING DEVICE
Filed March 20, 1937
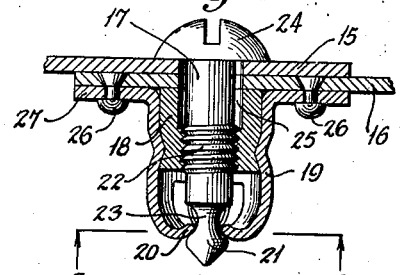
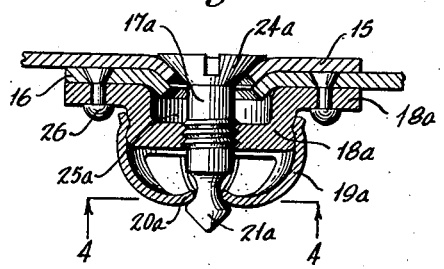
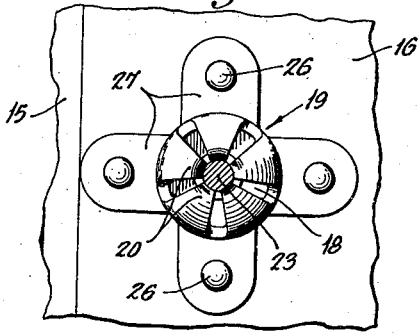
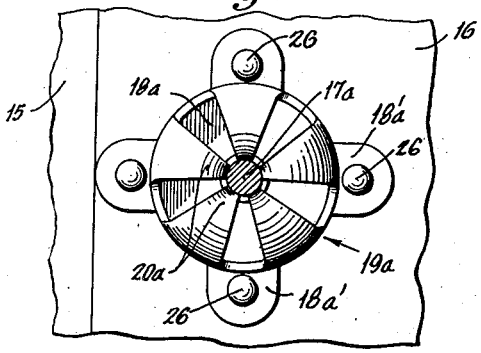
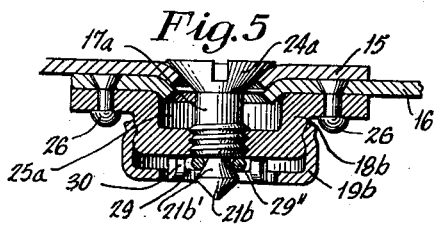
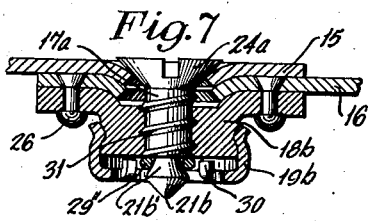
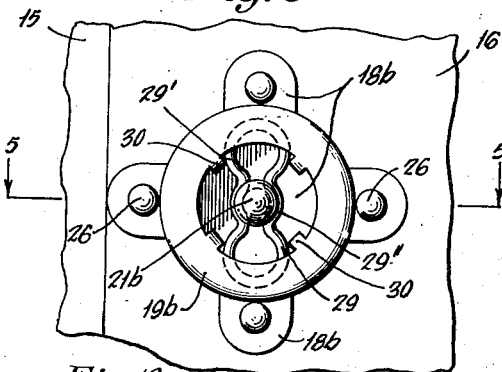
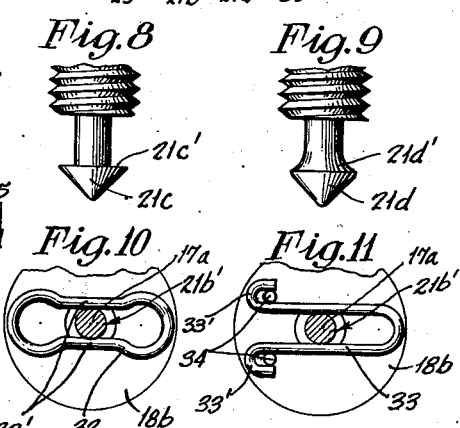
INVENTOR
Walter A. Semion,
BY
ATTORNEY Patented June 20, 1939

2,163,134

UNITED STATES PATENT OFFICE 2,163,134

FASTENING DEVICE

Walter A. Semion, Milford, Conn.

Application March 20, 1937, Serial No. 132,017

10 Claims. (Cl. 151—14)

This invention relates to fastening devices, and more particularly, to fastening devices which include an externally threaded draft member, as a screw, and a member having a cooperating internal thread, as a nut.

In building up sheet structures by screw and nut securement of the different sheet elements to be joined, a difficulty has been to provide a fastening device which, especially when used for assembling structures of thin sheet metal plates such, for instance, as are employed in airplane manufacture, may be absolutely relied on to insure against accidental disengagement of the screw thread from the nut thread. Not only in airplane manufacture, but in other assemblies of sheet elements, particularly when these elements are fairly thin, whether they be of metal or some other material, a fastening means including a threaded draft member is desirable.

An object of the invention is to provide a fastening means, for use in structures built up of thin sheets of any kind and for any purpose, which includes a screw and nut couple having ordinary threads, but in which the screw, when merely tightened up in the nut, becomes securely held against accidental movement relative to the nut to an extent to permit disengagement of the threads.

A feature of the invention is the inclusion in the fastener of a means for thus holding the screw which, on the one hand, is other than an auxiliary element carried within the nut for acting in a jamming or biting manner against the thread of the screw and characteristic of so-called nut-locks, and which, on the other hand, does not have to rely for its action on a distortion of a sheet metal part by the screw thread.

According to the invention, the means for holding the screw threads against accidental separation from the nut thread engages the screw in a part thereof beyond its thread, and in a way, as predetermined, either to prevent even deliberate disengagement of the screw and nut, or to prevent accidental disengagement of these parts but to permit them to be disengaged only by the deliberate exercise of an extraordinary amount of effort. Also, according to the invention, the holding means may be set to prevent such accidental loosening of the screw, from vibrations or otherwise, as would appreciably impair the desired assembly.

Another object of the invention is to provide a fastening means as above, in which the load is carried by the screw, and not by the screw-holding means.

In carrying out the invention, preferably, the holding means for the screw comprises a spring lock, one element of which is a locking member including a cam or wedge means and carried at the inner end of the screw shank and separated from the threaded part of the shank by an annular recess, and the other element of which is a spring detent, of the leaf, bent wire or other suitable type, which is moved by the cam or wedge means during tightening up of the screw, so as automatically to seize the locking member when the screw is fully tightened. A feature of the lock thus established is an arrangement of the parts such that the detent is under tension during maintenance of the lock.

Other features and advantages will be hereinafter apparent.

In the accompanying drawing, illustrating various embodiments of the invention as now preferred:

Figure 1 is a sectional view, partly in elevation, showing one form of fastening means according to the invention, and including a detent of the leaf spring type, as applied to a pair of sheet elements to secure them together.

Fig. 2 is a section taken on the line 2—2 of Fig. 1.

Fig. 3 is a view similar to Fig. 1, showing another embodiment.

Fig. 4 is a section taken on the line 4—4 of Fig. 3.

Fig. 5 is a view taken substantially on the line 5—5 of Fig. 6, showing still another embodiment.

Fig. 6 is a bottom plan view of the fastening means of Fig. 5.

Fig. 7 is a view similar to Fig. 5, and showing an embodiment like that of Fig. 5 except for modifications in the screw and nut elements.

Fig. 8 is an enlarged fragmentary detail, showing a screw having a different type of locking member beyond its thread than that shown in the views already mentioned.

Fig. 9 is a view similar to Fig. 8, showing a screw having still another type of locking member.

Fig. 10 is a fragmentary detail view, showing part of a nut in bottom plan, a screw in transverse section, and a detent spring of the same bent wire type as in Fig. 6, but differently shaped.

Fig. 11 is a view similar to Fig. 10, showing another of the possible variations in a detent spring of the bent wire type.

Fig. 12 is a view similar to Fig. 8, showing a screw having a plurality of locking members spaced along the axis of the screw.

Figs. 13 and 14, the former similar to Fig. 12 and the latter a section on line 14—14 of Fig. 13, illustrate an annular recess established around a neck other than a cylindrical one.

Each of the exemplifying forms of the invention illustrated in the drawing includes, as will be seen, a screw, a nut therefor, a bulbous locking member on the inner end of the screw beyond its thread, and a spring detent for engaging the locking member when the screw is sent fully home in the nut. A nut of some kind is an essential feature of the invention; the nut shown in all the illustrated forms of the invention is one individual to a particular screw, but whenever a nut is referred to in the appended claims, the reference is to any structure including a hole having an internal thread to coact with the thread of the screw.

In each case, the head of the screw bears against one side of the sheet structure being assembled from a plurality of sheet elements to be joined, and the nut bears against the other side of such sheet structure. The parts of the sheet structure to be joined may, for instance, be the overlapped margins of wall plates, or, for another example, one or more such plates, and a reenforcing sheet or strip for the latter. Any desired number of sheet elements, of metal or other material, may be thus joined, but in the present case merely two thereof are shown, a sheet 15 and a sheet 16.

Referring to Figs. 1 and 2, the fastening means here shown comprises a screw 17, a nut 18, and a shell 19 carrying a plurality of integral spring metal fingers 20, these for engaging a bulbous locking member 21 carried by the screw beyond its thread 22.

The locking member 21, which here has a conical lower portion and an annularly spherical upper portion, is joined to the inner end of the threaded shank of the screw by a reduced neck 23, thus providing an annular recess between the main body of the screw and the locking member.

Any external conformation may be given to the nut, but, conveniently, as here, it is cylindrical; as is also the main body of the shell 19, beyond the spring fingers 20, and which as shown houses the nut, being sleeved tight on the same to hold the nut and shell against relative rotation. In order to hold the nut against axial movement in the shell, the former may be peripherally recessed, and the shell crimped thereon, as illustrated.

The number of thread turns on the screw may be comparatively few, as illustrated in Fig. 1, and then, in order to keep the screw of a length to facilitate easy handling, especially when the fastener is very small, the screw shank may have a plain cylindrical portion between the thread and the screw head 24, accommodation for which could be provided in the nut if lengthened as shown and bored out as indicated at 25.

For ease and speed of securement of the fastening means, by a single workman, and also to allow the fastening means to be used where the nut would be at a more or less inaccessible side of the sheet structure being assembled, the nut is advantageously employed as a clincher nut, that is, it is restrained in some suitable manner against turning with the screw. To illustrate one manner of accomplishing this, the shell 19, clamped to the nut 18 as already explained, is shown as secured, as by rivets 26, to the sheet member 16; these rivets passing through extensions 27 integral with and radially offset from the main body of the shell at the end thereof opposite the spring fingers 20.

In certain cases, projection of the screw head is not objectionable, and the head 24 of the screw 17 is shown as a half-round one, and the plates 15 and 16 are flatly overlapped and so as to bring into registry the apertures therein through which the screw is to pass.

With the plates thus arranged, it is merely necessary, in order to secure the plates together, to insert the screw through the plates and into the nut until the screw thread 22 takes the thread in the nut, and then tighten up the screw, as with an ordinary screw driver. The lower conical portion of the locking member is a wedge, effective relative to all the spring fingers 20, and as the screw is tightened in the nut, these fingers are spread by the wedge. As the screw is fully sent home, the fingers 20 snap into the recess encircling the neck 23, and become positioned over the locking member 21, above its point of greatest lateral swell, as shown.

If the fingers 20, as is recommended, are resiliently biased to less spread than that they can have when snapped into place over the locking member 21 as just described, the spring detent for the locking member provided by these fingers will be under tension, and the spring lock comprised by said member and fingers will be one such that accidental disengagement of the screw thread from the nut thread is positively prevented. The fingers 20 may be made more or less stiffly resilient so as to preclude even temporary accidental loosening of the screw in response to intense vibrations continuing over long periods.

Yet, due to the shaping of the upper part of the locking member 21, the fastening means may be taken down whenever desired, by using a very strong turning force on the screw 17, in a direction to loosen the same, deliberately applied at the screw head. In such case, the upper part of the locking member 21 acts as a wedge or camming agent to spread the fingers 20 sufficiently to permit withdrawal of the locking member beyond these fingers.

It will be noted that the load is not taken by the fingers 20 or any part of the shell 19, but, instead, is taken wholly by the screw between the head of the latter and the nut.

Referring to Figs. 3 and 4, this shows a form of the invention like that above described, except that it is the nut, marked 18a, which is secured to the sheet element 16, the shell, marked 19a, is shortened axially and expanded laterally, and the screw 17a, shorter and with less turns of thread than the screw 17 of Fig. 1, has a countersunk head so that the fastening means will be flush over the sheet element 15. The conical under wall of the head 24a of the screw 17a is received in a conical depression resulting from pressing in the material of the plates through which the shank of the screw is passed, and the nut 18a has a recess 25a in which the pressed in material of the plates is received. In this embodiment, the nut is shown as riveted to the plate 16, these rivets passing through extensions 18a' radially offset from the top of the nut, and the shell 19a is shown as crimped to the lower end of the nut. Below the nut this shell carries spring fingers 20a like the fingers 20, except that the former are less sharply arched along their lengths and are thinner than the latter, so that, aside from differences of material, the fingers 20a will be less stiffly resilient than the fingers 20. The locking member 21a is shown as of the same shape as the member 21, and the action of the embodiment now being described is like that of Fig. 1. However, with the fingers 20a less stiffly resilient than the fingers 20, the amount of effort having to be applied deliberately to take down the fastening means will be less in the case of the construction of Fig. 3 than that of Fig. 1.

The shortening of the length of the screw 17a over that of the screw 17 is merely to indicate that the screw employed may have considerable variations in this regard. The showing of fewer turns of thread on the screw 17a than on the screw 17 is for the purpose of emphasizing the fact that the security of the fastening is not dependent on a large number of thread turns. Merely one full turn of thread satisfies all ordinary requirements, although preferably several turns will be employed. And in this connection it is remarked that the arrangement of the parts, in any form of the invention employing a fairly stiff spring, is desirably such that before the locking member contacts its detent the screw and nut are in threaded engagement, say to at least the extent of about one full turn of the screw thread, to facilitate final locking of the screw. In any case, however, it is an important feature of the invention that the locking member wedgingly or cammingly engages and laterally displaces the detent to force itself past the latter during turning of the screw while its thread is in engagement with the nut thread, and snaps past the detent and into locking engagement therewith as the screw is fully tightened.

The spring detents of Figs. 1 and 3, are desirably so resiliently biased that when such detent is engaged with its locking member after full coupling of the nut and screw, the detent is under tension and applies radial as well as axial pressure on the screw.

In Figs. 5 and 6, I have shown a form of the invention in which the locking member 21b is provided with a high pitch or slope, as at 21b', between the point of maximum lateral swell of the member and the threaded shank of the screw. With the locking member thus formed, the detent prevents casual rotation of the screw in the nut, but allows the screw to be deliberately disengaged by exerting a strong turning force on the screw which, however, need not be as great as that required in Figs. 1 and 3.

In the embodiment now being described, also, the nut 18b is shown as secured by rivets to the plate 16, and a shell carrying the spring detent is shown as crimped on and thereby secured to the nut, as in Fig. 3. The shell 19b is non-integral with the detent, but is a cage for enclosing and positioning the detent, which latter is shown as in the form of a bent wire sring 29. This spring is illustrated best in Fig. 6 as shaped to provide end loops 29', and between these a pair of central and opposed arcuate bends 29'' which form the detent proper. The bottom opening in the shell 19b has struck up into the same, prongs 30 which engage the loops 29' and coact with the bottom annular wall of the shell to hold the detent 29 properly in position and against rotation with the screw.

Referring to Fig. 7, the form of the invention here shown is like that of Fig. 5, except that the screw is illustrated as having a thread 31 of high pitch for quick application of the fastening means. In this form of the invention, the thread extends along the full length of the screw, as it may in any of the other forms shown. In the form of the invention illustrated in Fig. 7, the high pitch thread may extend over less than the full length of the screw.

Figs. 8 and 9 show other forms of locking members according to the invention. In Fig. 8, the locking member 21c on the inner end of the screw has a flat shoulder 21c' just beyond its point of maximum lateral swell; while in Fig. 9 the locking member 21d has a conical formation 21d' above its point of maximum lateral swell which is transversely concavely rounded, as contradistinguished from the corresponding formations in Figs. 1 and 3, which are transversely convexly rounded. With a construction as in Fig. 8, even deliberate disengagement of the screw from the nut is impossible, from the side of the plate assembly carrying the screw head. With the construction of Fig. 9, deliberate disengagement of the screw from the nut by force exerted on the screw head is possible, but only upon the application of even more effort than would be required in connection with deliberate taking down of the construction of Fig. 1 or 3.

Referring to Figs. 10 and 11, bent wire spring detents are illustrated differing somewhat from that of Fig. 6.

In Fig. 10, where a part of the nut is seen in bottom plan and the reduced neck of the screw between its threaded shank and its locking member is seen in transverse section, the spring detent is shown as in the form of a bent wire spring 32 similar to the spring 29 of Fig. 6, except that the spring 32 has a pair of central and opposed straight portions 32' constituting the detent proper. A holding and positioning shell for the spring 32, as one similar to the shell 19b, is desirably present, although not shown.

In Fig. 11, where the nut and screw are illustrated as in Fig. 10, the spring detent is shown as in the form of a bent wire U-spring 33 having terminal curls 33' which take about pins 34 dependent from the bottom of the nut. In this case, the spring detent is direct-connected to the nut, and in a way to prevent relative rotational movement between the detent and the nut. The pins 34 are shown as unheaded ones, and so it would be desirable here, also, to employ a suitable means for preventing loss of the detent from the nut, such, for instance, as a shell similar to the shell 19b.

The spring detents 29, 32 and 33, like the spring detents of Figs. 1 and 3, are desirably so resiliently biased that when such detent is engaged with its locking member after full coupling of the nut and screw, the detent is under tension and applies radial as well as axial pressure on the screw.

In Fig. 12, for the purpose of illustrating that the screw may carry a plurality of locking members spaced along the screw axis, so that a screw of a given length may be applied in assembling sheet structures of various thicknesses, the screw is shown as carrying two locking members 21e and 21f.

As shown in Figs. 13 and 14, the screw may have a reduced neck portion of other than circular cross-section. The neck portion, for instance, could be so shaped as to have corner elements spaced around the same, as by making the neck portion polygonal in cross-section. As an example of one such polygonal formation, Figs. 13 and 14 illustrate a neck portion 23' which is of square cross-section. Such a neck portion is adapted to coact with the detent which engages the locking member, in a way further to prevent rotation of the screw.

While various forms of the invention have been shown and described in detail, it will be understood that other variations and modifications are possible within the invention and portions of the improvements may be used without others.

I claim:

1. A fastening means for assembling sheet structures, comprising a nut member for placement on one side of the assembled sheets; a headed screw member for insertion through the sheets and for engagement of its thread with the thread of the nut member to thereby hold the sheets together; and means carried by one of said assembled sheets for applying pressure axially on the screw beyond its thread and beyond the nut member for holding the screw and nut members against relative casual rotation, the said means applying the axial pressure on the screw in the direction of the insertion of the same through the sheets.

2. A fastening means for assembling sheet structures, comprising a nut member for placement on one side of the assembled sheets; a headed screw member for insertion through the sheets and for engagement of its thread with the thread of the nut member to thereby hold the sheets together; and means for holding the screw and nut members in threaded engagement against casual relative rotation, including a locking member carried by the screw beyond its thread and a detent for the locking member secured to one side of the assembled sheets, said detent cooperating with the locking member to urge the screw member in the direction of insertion of the same through the sheets.

3. A fastening means as in claim 1, in which said pressure applying means includes a spring for engaging the screw member beyond its thread and for maintaining such engagement while under tension to resist casual relative rotation between the screw and nut members.

4. A fastening means for overlapping margins of plates, comprising a nut member rigidly secured to one of the plates; a headed screw member inserted and extending through aligned openings in the plates and engaging the nut member to thereby fasten the plates together; and means separate from the nut member for applying radial and axial pressure on the screw member in the direction of insertion of said screw member to resist casual rotation thereof in the nut member.

5. A fastening means for overlapping margins of plates, comprising a nut member rigidly secured to one of the plates; a headed screw member inserted and extending through aligned openings in the plates and engaging the nut member to thereby fasten the plates together; and means separate from the nut member for applying axial pressure on the screw member to resist casual movement thereof in the nut member and to normally urge it in the direction of its insertion through the plate.

6. A fastening means for assembling sheet structures, comprising a nut adapted to be positioned at one side of the assembled sheets; a screw for insertion through the sheets and for engagement of its threads with the threads of the nut to thereby hold the sheets together; means for preventing rotation of the nut, said means including a shell carried by said sheets sleeving said nut, and means formed integrally with the shell for applying pressure on the screw beyond its thread and beyond the nut member for holding the screw and nut members against relative casual rotation.

7. A fastening means for assembling sheet structures, comprising a nut member for placement on one side of the assembled sheets; a headed screw member for insertion through the sheets and for engagement of its thread with the thread of the nut member to thereby hold the sheets together; and means separate from the nut member for resisting casual rotation of the screw member in the nut member, said means including a bulbous locking member on the screw member having a camming surface beyond its thread, a shell carried by said nut member housing resilient detent means adapted to engage said camming surface of the locking member to urge the screw member axially.

8. A fastening means for assembling sheet structures, comprising a nut member for placement on one side of the assembled sheets; a headed screw member for insertion through the sheets and for engagement of its thread with the thread of the nut member to thereby hold the sheets together; and means separate from the nut member for resisting casual rotation of the screw member in the nut member, said means including a bulbous locking member presenting a tapered camming surface on the screw member beyond its thread, a shell sleeving said nut member and having an end thereof rigidly secured to the same, and a resilient detent housed and carried by said shell adapted to engage said camming surface to apply an axial thrust to said screw member and prevent casual movement of the same in the nut member.

9. A fastening means for assembling sheet structures comprising a nut member for placement on one side of the assembled sheet; a headed screw member for insertion through the sheets and for engagement of its thread with the thread of the nut member to hold the sheets together; and common means carried by one of said assembled sheets for holding said nut against rotation and for applying pressure on the screw beyond its thread and beyond the nut member for holding the screw and nut members against relative casual rotation.

10. In a fastening means for overlapping margins of plates comprising a nut member rigidly secured to one of said plates; a headed screw member extending through aligned openings in the plates and engaging the nut member to thereby fasten the plates together; means for resisting casual rotation of the screw member in the nut member, said means including a groove formed in the screw member adjacent the end thereof, said groove having a wall tapering from the end of the screw toward the head; and a resilient detent for engaging said tapering surface for applying a pressure thereto having a component extending in the axial direction of the screw.

WALTER A. SEMION.